May 10, 1960      M. TAMA      2,936,326
METHOD AND APPARATUS FOR PRESSURE METAL DISPENSING
Filed May 2, 1955      8 Sheets-Sheet 1
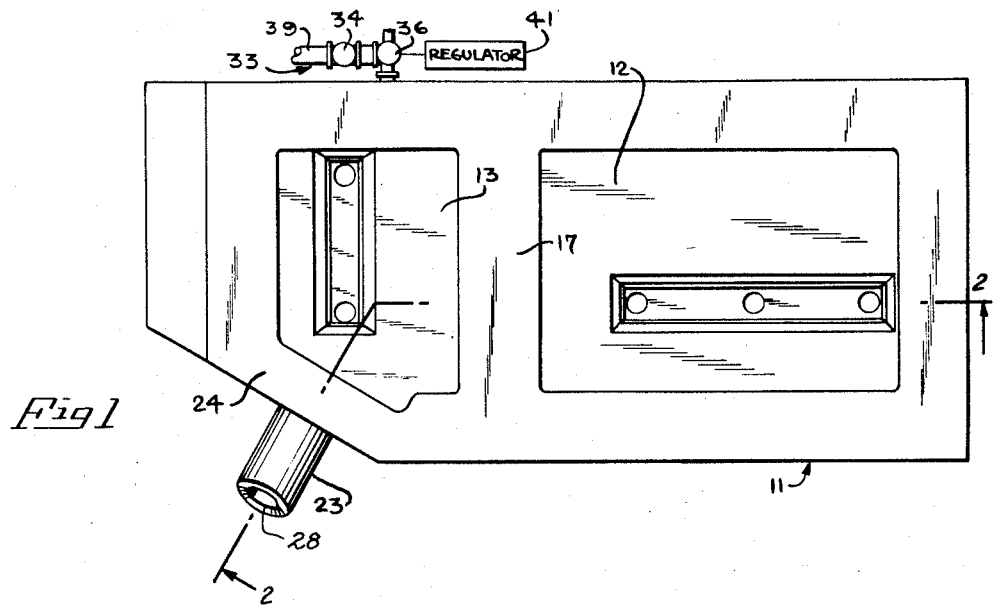
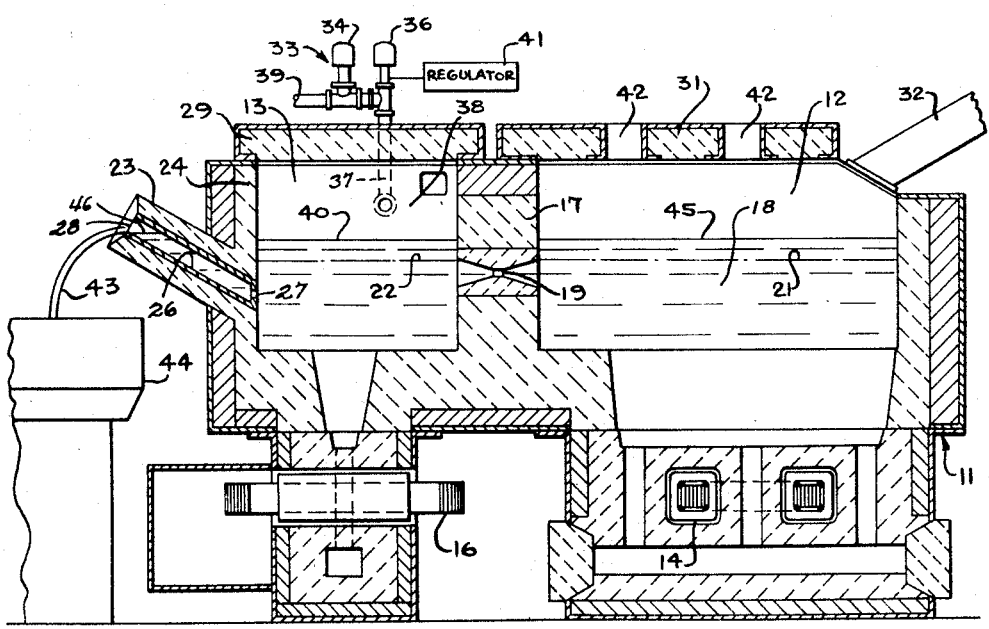
INVENTOR:
MARIO TAMA,
BY
HIS AGENTS.

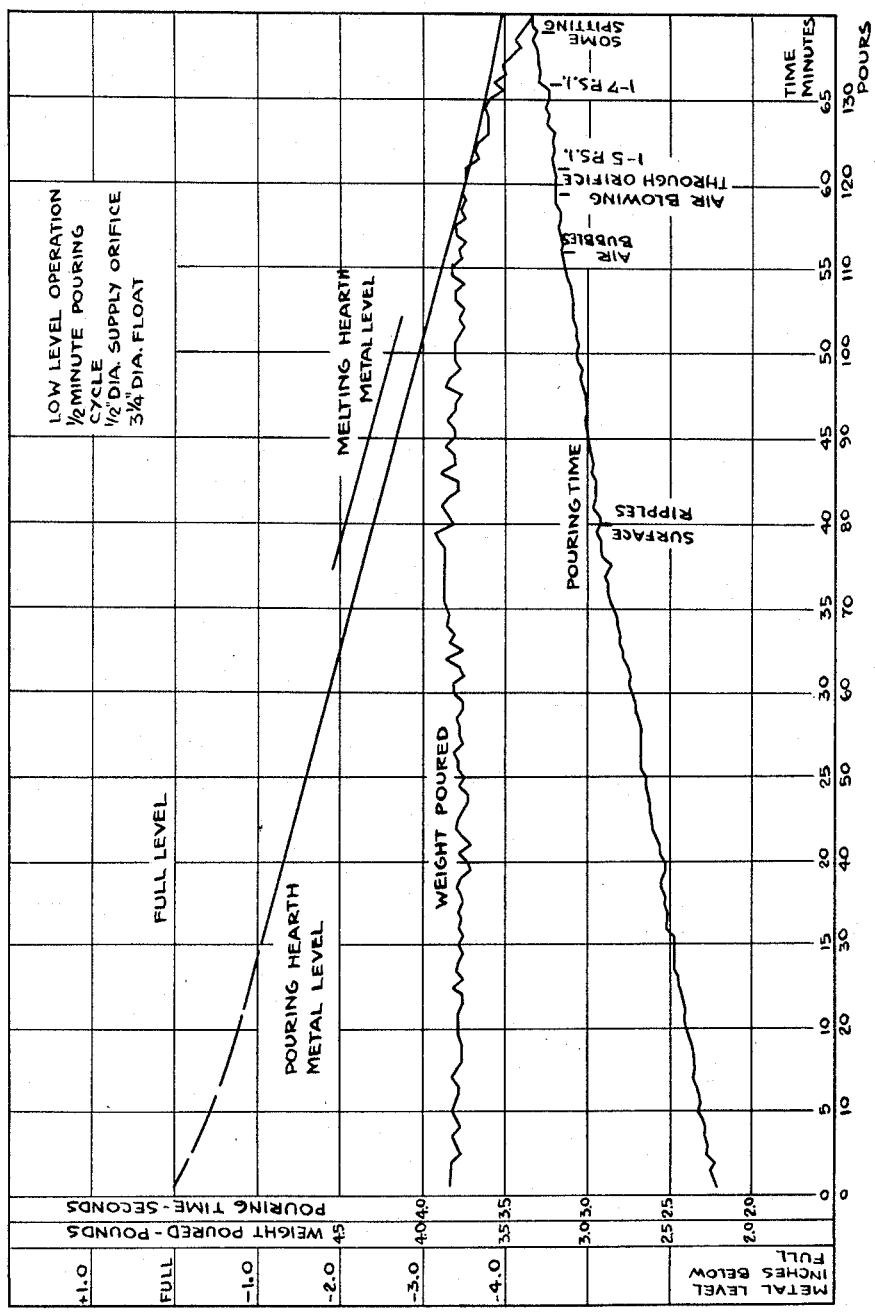

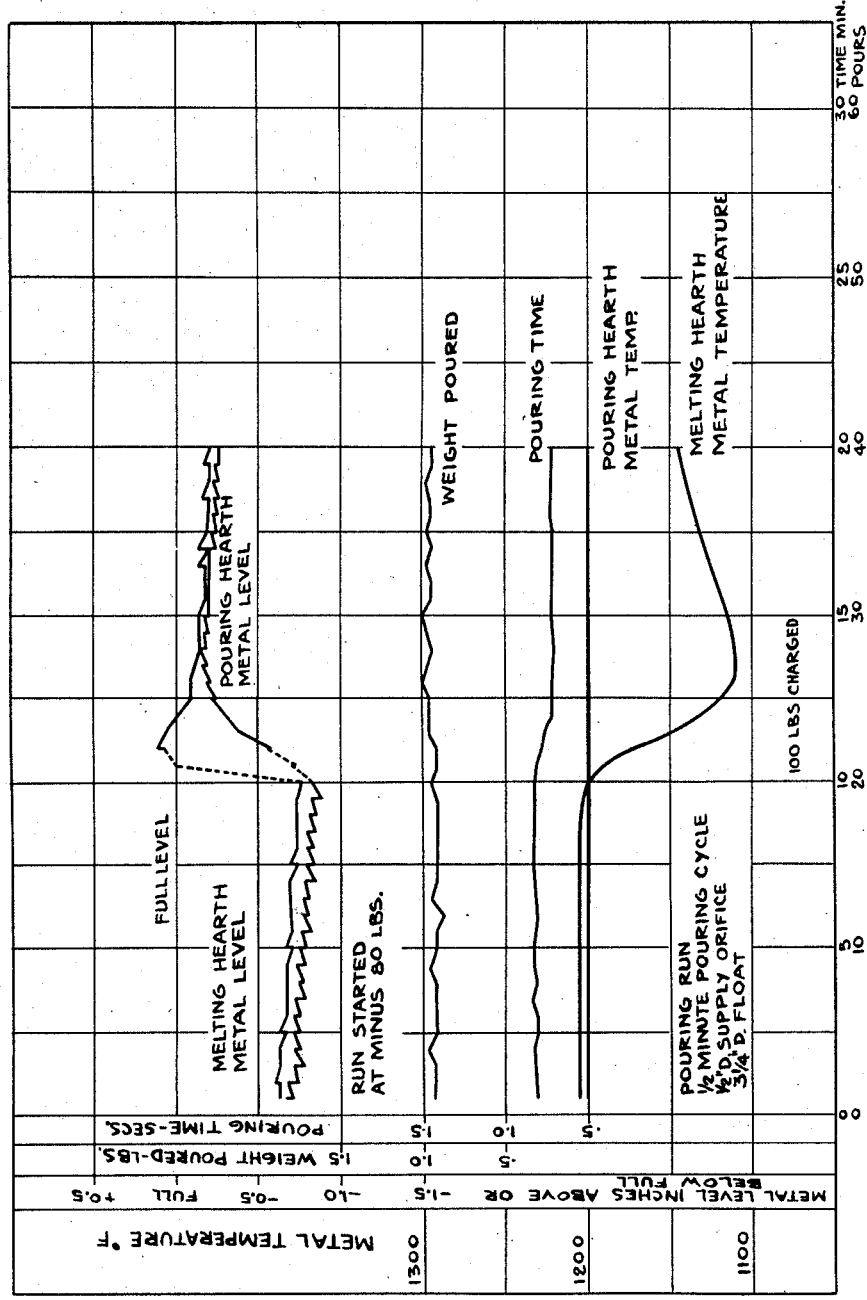

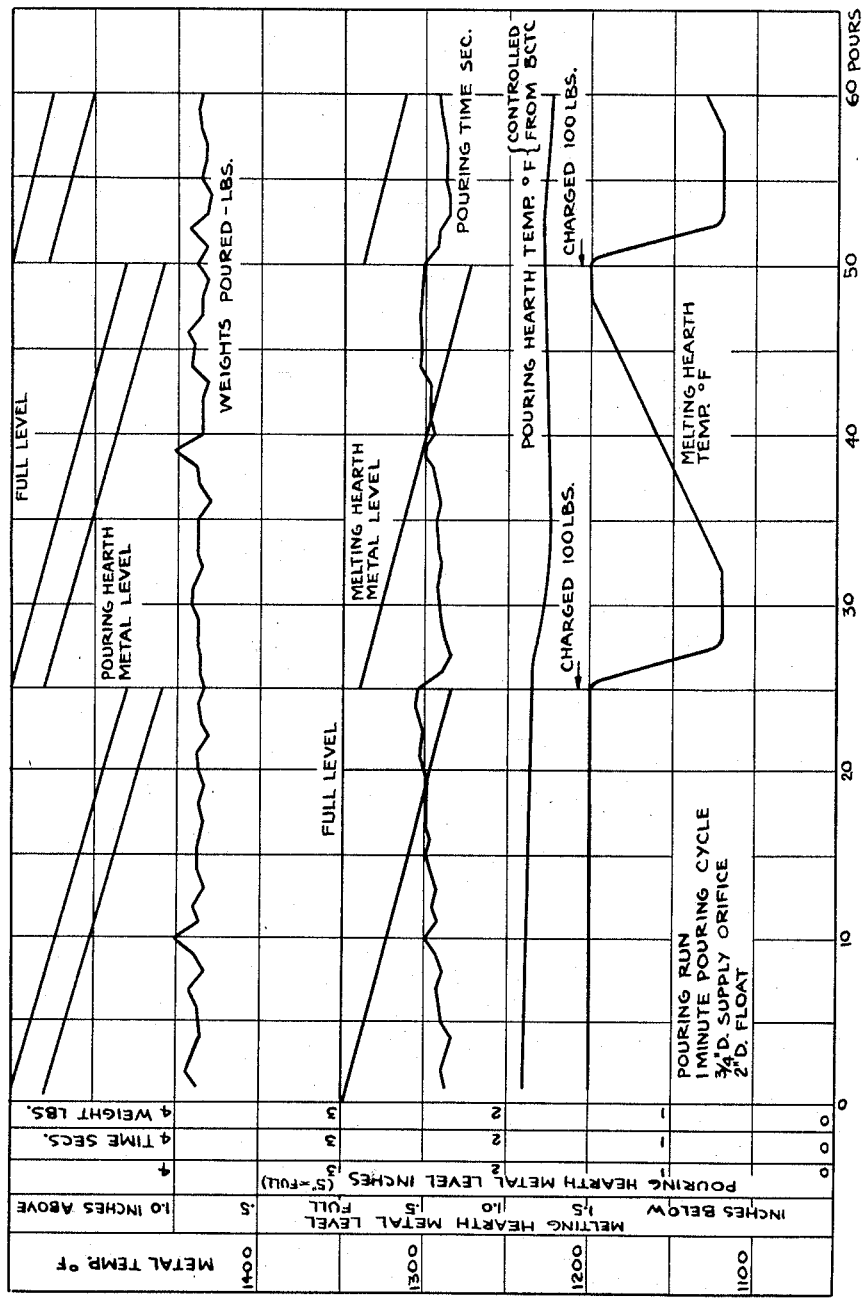

May 10, 1960  M. TAMA  2,936,326
METHOD AND APPARATUS FOR PRESSURE METAL DISPENSING
Filed May 2, 1955  8 Sheets-Sheet 5
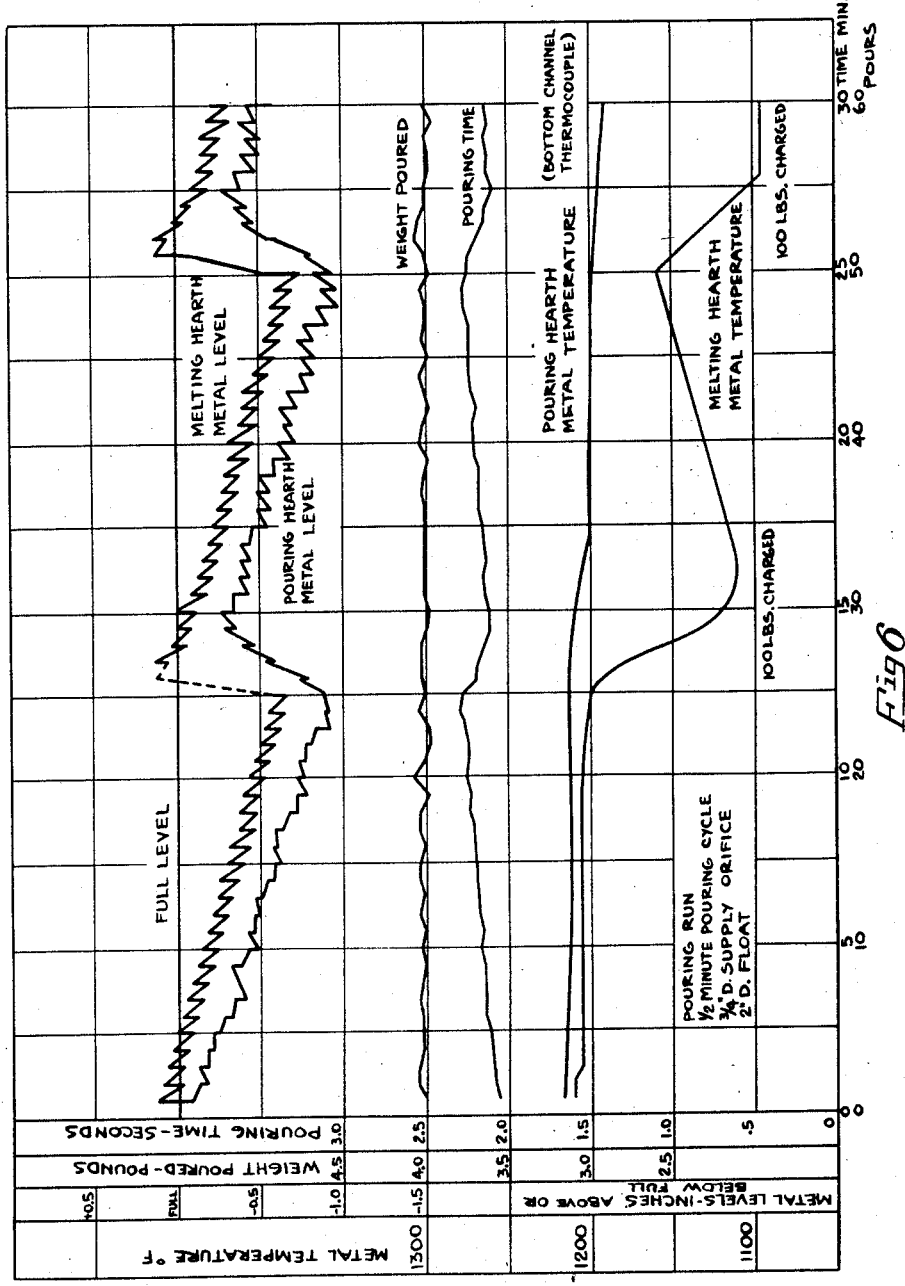
INVENTOR:
MARIO TAMA,
BY
HIS AGENTS.

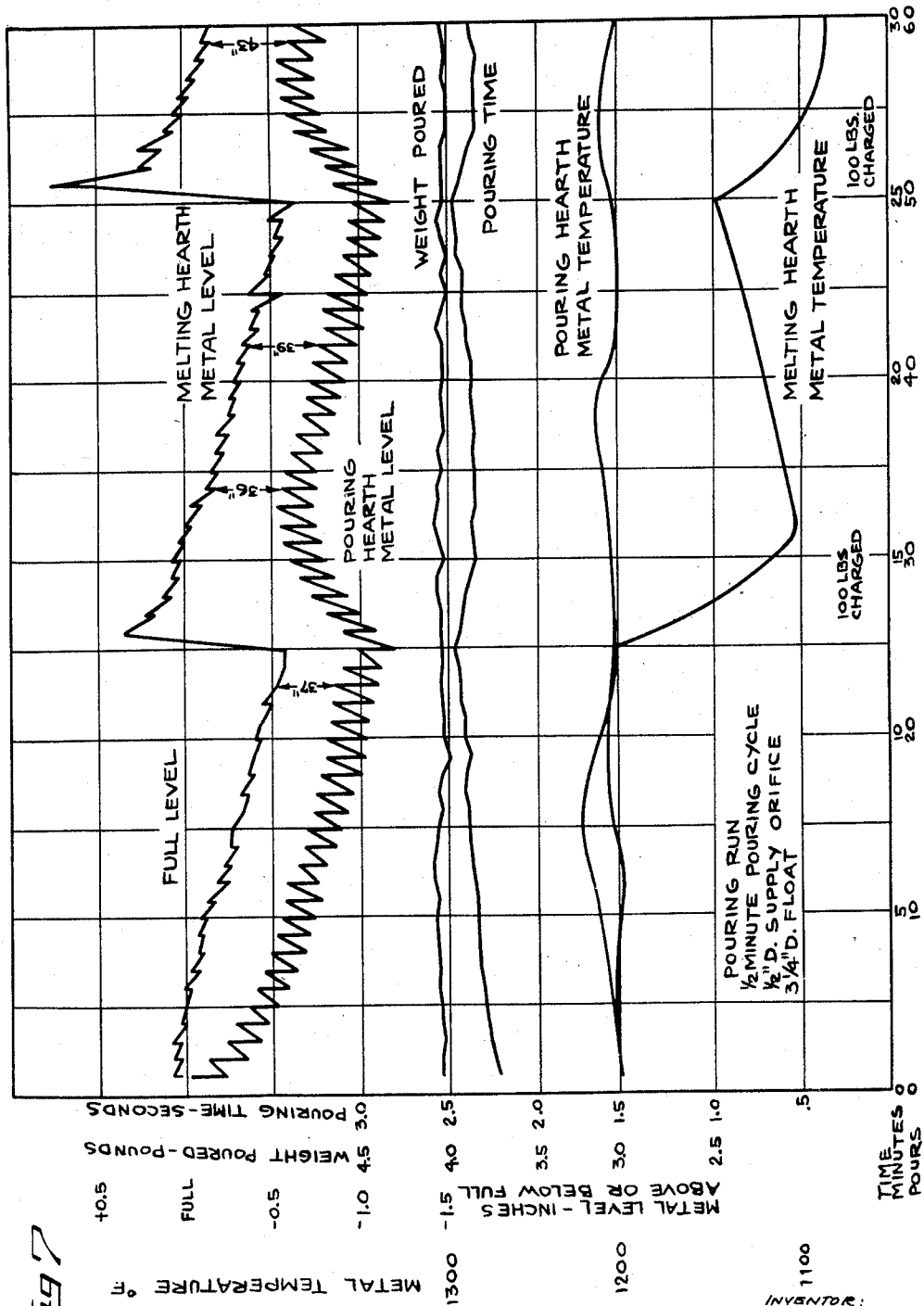

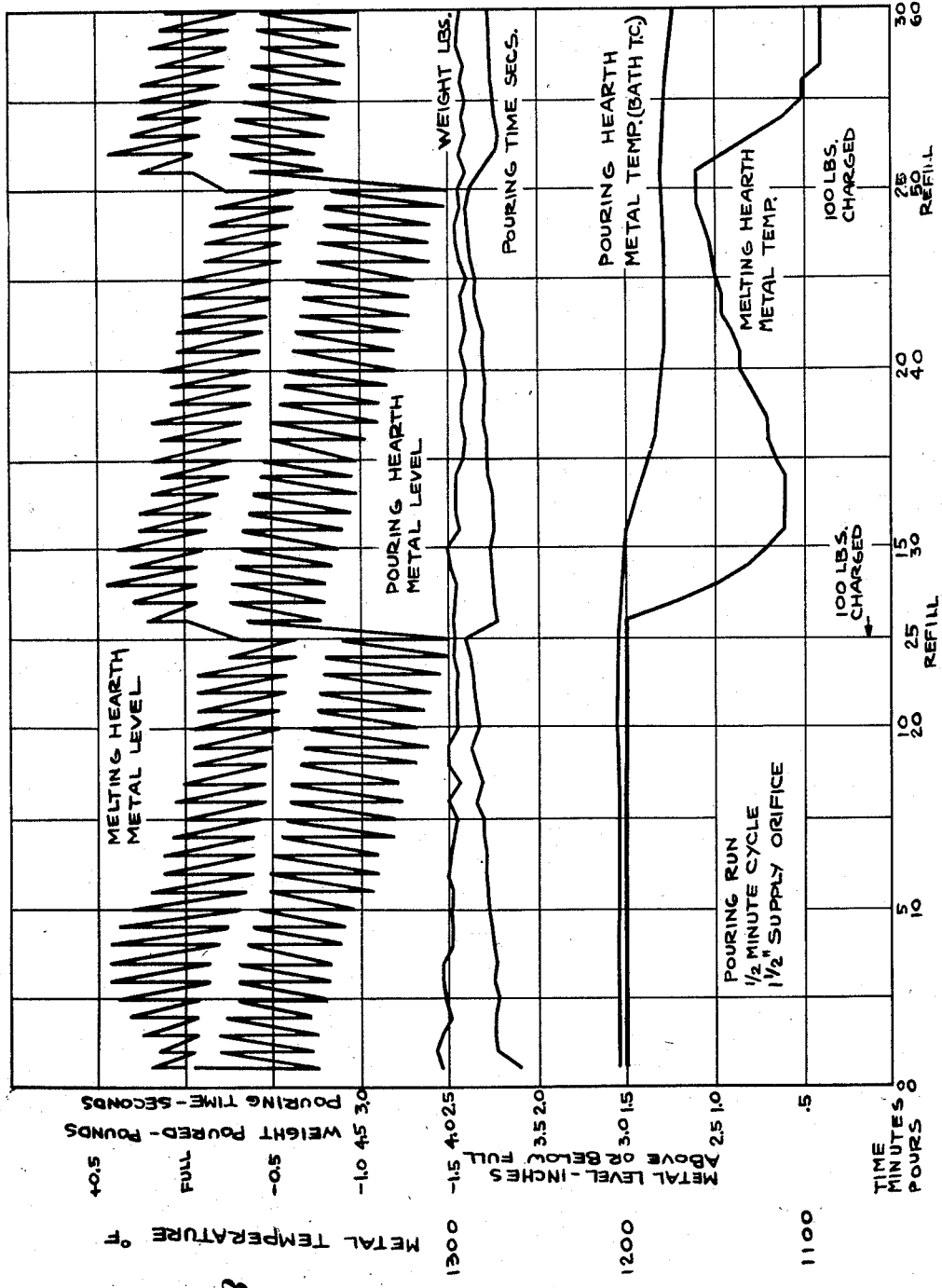

United States Patent Office 2,936,326
Patented May 10, 1960

2,936,326

METHOD AND APPARATUS FOR PRESSURE METAL DISPENSING

Mario Tama, Morrisville, Pa., assignor to Ajax Magnethermic Corporation, Youngstown, Ohio, a corporation of Ohio Application May 2, 1955, Serial No. 505,098

27 Claims. (Cl. 13—33)

The invention relates to the art of dispensing molten metal from a holding furnace, for instance discharging molten met towards a mold, and relates more particularly to methods and apparatus for intermittently dispensing accurate amounts of molten metal from a vessel.

This is a continuation-in-part of my copending application Serial No. 29,263, filed May 26, 1948, now Patent No. 2,707,718, dated May 3, 1955.

In the mass production of castings, it is required to supply repeatedly accurate amounts of metal, free from any slag or oxides, delivered to the molds at the proper temperature in rapid succession. As all the castings have identical volume and weight, the mass of metal delivered must be the same during each discharge.

These objects are well accomplished by earlier apparatus, notably that described in my Patent No. 2,674,640, dated April 6, 1954. Difficulties arise where it is desired to provide for continuous operation for long periods of time without any interruption for the charging.

It is therefore among the objects of the instant invention, to provide for methods and means for charging a dispensing container independently of the successive discharge therefrom. It is a further object of the invention to provide for discharging at one rate, while charging at a different rate, for instance continuously, with the rate of discharge frequency independent from the charging.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

In the drawings,

Fig. 1 is a plan view of the apparatus in accordance with the invention, but shown without lids;

Fig. 2 is a sectional view taken on line 2—2 of Fig. 1; and

Figs. 3–9 are graphs showing the results of tests made with the apparatus.

Figure 9:
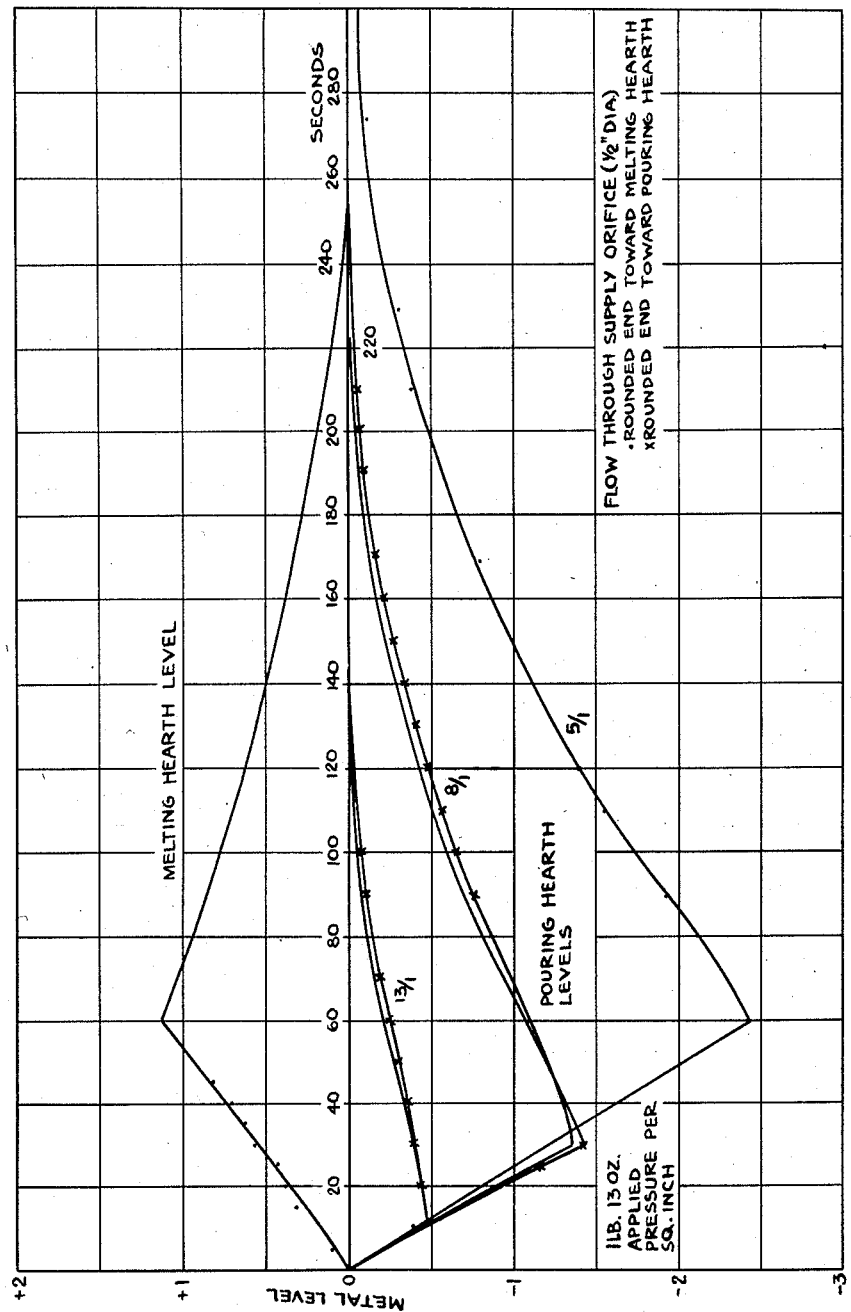

In carrying the invention into effect in one of the embodiments which has been selected for illustration in the accompanying drawings and for description in this specification, and referring now to Fig. 1 and 2, there is provided a furnace generally indicated at 11 which forms two chambers or vessels or containers, namely a supply chamber 12 and a pouring or holding chamber 13. Each of the chambers 12 and 13 has a separate heating means such as an electromagnetic induction unit 14 for the chamber 12, and an electromagnetic induction unit 16 for the chamber 13. Between the chambers 12 and 13 there is disposed a preformed and prefired refractory partition 17 which separates the chambers laterally from each other so that each chamber is disposed entirely on one side of the partition 17. The two chambers may be considered as a single reservoir in which two portions of the metal bath 18 are separated laterally from each other by the partition 17.

The partition 17 has an orifice 19 that provides for intercommunication between the chambers 12 and 13. The orifice 19 is located below the minimum level 21 of the metal within the supply chamber 12 and also below the minimum level 22 of the holding chamber 13, so that it will always be immersed in the metal bath. The orifice 19 may, for instance, have at its narrowest part a diameter of from ½″ to 1½″ and has adjacent the narrowest part outward flaring conical enlargements opening towards the chambers 12 and 13; these enlargements serve to prevent the freezing of the metal in contact with the orifice 19.

The discharge nozzle 23 is connected to a side wall 24 of the holding chamber 13. It surrounds a tube 26 that has near its lower end an inlet 27, and has near its upper end an outlet 28. The inlet 27 is disposed below the minimum level 22 of the metal in the holding chamber 13, so that it will in all positions of the metal level in the chamber 13 be immersed in the metal bath. Preferably, as shown in Fig. 2, the inlet 27 is disposed lower than the orifice 19.

The inlet 27 may have a diameter of about ½″, while the remainder of the tube 26 has a considerably larger diameter and is cylindrical, preferably uniform throughout the length of the tube between the inlet 27 and the outlet 28; the diameter of the remainder of the tube 26 may, for instance, be 1½″. The inlet 27 thus forms a constriction for the tube within the metal bath. This as explained in my aforementioned Patent No. 2,674,640 promotes and, indeed renders possible, a gentle splash-free parabolic discharge flow of the metal from the outlet 28 of the nozzle 23, upon application of pressure to the metal level within the holding chamber 13.

Closure means, such as a lid or cover 29 is applied to the top of the holding chamber 13, and a cover 31 is applied to the supply chamber 12. A metal charging mechanism 32 may be provided to charge the supply chamber 12 with fresh metal.

Means are provided for the application of gaseous pressure to the level of the metal in the holding chamber 13. This comprises, for instance, an air conduit 33 which includes solenoid operated valves 34 and 36 to regulate the pressure of air or other gaseous substance delivered by a pipe 37 to the hearth or space 38 above the metal level and below the cover 29, within the holding chamber 13. The valves 34 and 36 may be switched in such a way that one of them is open when the other one is closed. The valve 36 may be connected to the open air by a tube 39. A regulator 41 may be provided that changes either the length of time of application of the pressurized air to the space 38, or changes the amount of pressure, or both, in dependency of the momentary level position within the holding chamber 13.

A control in dependency of the momentary metal level may be made in various manners by ascertaining the level and adjusting the regulator for the succeeding discharge. The level position may be ascertained either electrically or optically or mechanically, or in other manner, all as described in detail in my co-pending patent application Serial No. 386,434, filed October 16, 1953.

The cover 29 is preferably fitted air tightly over the holding chamber 13, so that upon the application of air pressure to the space 38, no air will leak to the exterior. The cover 31 for the supply chamber, on the other hand, may be provided with openings 42.

Upon application of momentary air pressure delivered by the pipe 37 to the space 38, metal will be discharged from the holding chamber 13 through the tube 23. It will flow in a gentle parabolic stream 43 into a mold 44 that may be placed below. The stream 43 will be a splash-free stream owing to the constriction provided by the inlet 27, and will fill the mold without splashing.

The mold 44 may be one of a series of molds to be pushed in succession into position to receive the metal stream 43.

Figs. 3 to 9 are graphs which with their legend are self-explanatory. In Fig. 3 there are various data plotted over the pouring time. These data are the momentary metal level, the weight poured and the pouring time as adjusted by the regulator.

Fig. 4 shows the same data plotted over time, but also including the temperature of the metal in degrees Fahrenheit.

In Fig. 5, various data are plotted over a series of pours, such as weight, level, and others, and, like Fig. 4 shows two stages of charging.

Figs. 6 to 8 show similar data.

Fig. 9 is a chart indicating the flow through the supply orifice 19 of ½" diameter.

The operation is as follows. The furnace 11 is primed with molten metal until the metal levels 45 and 40 in the supply chamber 12 and holding chamber 13, respectively, are reached. The metal will reach a level 46 within the tube 26. These levels are at substantially the same height when the apparatus is not operated. New metal in the form of pigs or solid scrap is charged continuously, or at desired intervals, into the supply chamber 12, for instance by means of the charging mechanism 32.

When metal is to be discharged, compressed air of a predetermined pressure is delivered by the pipe 37 into the space 38 of the holding chamber 13. This causes a discharge through the nozzle 23, as the level 46 will be raised in the tube 26 until it flows out of the outlet 28 in a parabolic stream 43 into the mold 44 below. It causes lowering of the metal level 40 and expulsion of a small amount of metal from the holding chamber 13 through the orifice 19 into the supply chamber 12, causing a slight rising of the level 45 when the valve 34 is opened.

When the valve 36 is closed, the pressure inside the holding chamber 13 will suddenly be released. The metal level 45 will recede, and the three levels 40, 45 and 46 will again be at substantially the same height. The regulator 41 operates to open the valve 34 automatically upon completion of the pouring time interval to which the regulator 41 has been pre-set.

As the operation of successive discharges proceeds, fresh unmolten metal is charged to the supply chamber 12. It is thus possible to discharge continually while charging either continuously or at a desired rate different from the rate of continual discharges.

The chambers 12 and 13 are preferably heated from separate sources 14 and 16. The orifice 19 is so dimensioned that it will permit flowing from the supply chamber 12 into the holding chamber 13 freely during the time intervals between the application of compressed air in the space 38, but it is sufficiently small to restrain any but minute amounts from being forced under the high pressure exerted by the air in the holding chamber 13 from flowing from the holding chamber 13 through the orifice 19 into the supply chamber 12.

The small size of the orifice 19 thus prevents excessive level variations in both chambers, which has the further advantage that the cold metal in the supply chamber 12 does not materially affect the higher temperature in the metal bath prevailing in the holding chamber 13. It is in connection with these temperature differentials between the chambers, that the separate heating means 14 and 16 for the separate chambers 12 and 13 is especially advantageous.

As evident from Fig. 1 and 2, the supply chamber 12 is larger than the holding chamber 13. The supply chamber 12 holds about 1700 lbs. of metal, while the holding chamber 13 holds about 800 lbs. The level variation within the supply chamber 12 is one inch for about 100 lbs. of metal, while in the holding chamber 13 it is about 50 lbs. per inch.

As best shown in Fig. 2, the nozzle 23 is at an angle with the horizontal and the vertical directions, and the metal is forced to rise at an inclination in the tube 26 for the discharge.

It will be apparent to those skilled in the art that the novel principles of the invention disclosed herein in connection with specific exemplification thereof will suggest various other modifications and application of the same. It is accordingly desired that in construing the breadth of the appended claims they shall not be limited to the specific exemplification of the invention described herein.

Having thus described the invention, what I claim as new and desire to be secured by Letters Patent is as follows:

1. In a method of intermittently dispensing molten metal from a holding vessel fed from a supply vessel adjacent thereto and separate therefrom and at all times intercommunicating substantially unchangingly therewith, the steps comprising, intermittently applying elevated gas pressure to the level of said molten metal in said holding vessel to discharge therefrom a selectively variable predetermined amount, guiding the discharged metal upwardly at an angle to the vertical out of said holding vessel, feeding molten metal from said supply vessel into said holding vessel during the intervals between elevated pressure applications, while throttling to maintain small the amount of metal flowing during the elevated pressure application from said holding vessel into said supply vessel, and heating inductively the metal in the holding vessel separately from the metal in said supply vessel.

2. In a method as claimed in claim 1, continuously charging said supply vessel.

3. In a method as claimed in claim 1, controlling the amount of metal dispensed at each discharge by changing the relation that existed at the preceding discharge between pressure applied and length of time of pressure application in dependency of the change of position of the level in said holding chamber between succeeding discharges.

4. An apparatus for discharging in a free gentle parabolic flow successive predetermined amounts of molten metal comprising in combination, a casing structure defining a supply chamber and a holding chamber laterally adjacent thereto, a partition separating said chambers, so that each chamber will be entirely on an opposite side of said partition, removable closure means for said holding chamber, means for melting metal in said supply chamber, means for maintaining the metal in said holding chamber in a molten state, means operable for applying gas pressure from above to the level of the molten metal bath in said holding chamber, a discharge tube having in its lower end an inlet intercommunicating with the metal bath of said holding chamber below the level thereof and having in its upper end on the exterior of said chamber a discharge outlet, said partition having an orifice below the level of the metal bath, whereby, upon the momentary application of elevated gas pressure, metal will be forced through said tube to the exterior flowing out of the tube outlet in a free gentle flow substantially splash-free into a mold disposed below said outlet and, upon reduction of said momentary pressure following discharge, metal will flow through said orifice from said supply chamber into said holding chamber to replenish the supply therein, said orifice being uncovered and sufficiently small to restrain passage of any but small amounts of metal from said holding chamber to said supply chamber when said momentary elevated pressure is applied, and sufficiently large to pass metal between said chambers when said elevated pressure is reduced.

5. An apparatus for discharging in a free gentle parabolic flow successive predetermined quantities of molten metal, comprising in combination, a casing structure defining a supply chamber and a holding chamber laterally adjacent thereto, a partition separating said chambers so that each chamber will be entirely on an opposite side of said partition, means operable for applying gas pressure from above to the level of the molten metal bath in said holding chamber, a discharge tube having in its lower end an inlet intercommunicating with the metal bath of said holding chamber below the level thereof and having in its upper end on the exterior of said chamber, a discharge outlet, said partition having an orifice below the level of the metal bath, whereby, upon the momentary application of elevated gas pressure, metal will be forced through said tube to the exterior, flowing out of the tube outlet in a free gentle substantially splash-free flow, said orifice being sufficiently large to pass metal between said chambers upon reduction of said momentary pressure following discharge to replenish the supply in said holding chamber from said supply chamber, said orifice being uncovered and sufficiently small to restrain passage of any but small amounts of metal from said holding chamber to said supply chamber when said momentary elevated pressure is applied.

6. An apparatus as claimed in claim 5, said inlet being disposed lower than said orifice to restrain entry of air into said discharge tube.

7. An apparatus, as claimed in claim 5, the level of the metal bath in said holding chamber varying upwardly from a minimum level position, said orifice and inlet being disposed below the minimum level position of the metal bath in said holding chamber to restrain gas escaping through the inlet and the orifice, respectively.

8. An apparatus, as claimed in claim 5, said inlet forming a constriction for said tube, whereby said metal will be discharged from the outlet in a free gentle flow.

9. An apparatus, as claimed in claim 5, said tube and inlet and outlet defining a passage having a constriction below the metal level in all level positions of the bath.

10. An apparatus, as claimed in claim 5, said inlet defining an area smaller than any cross-sectional dimension of said tube between the inlet and outlet thereof.

11. An apparatus, as claimed in claim 5, said inlet defining an area smaller than any cross-sectional dimension of said tube between the inlet and outlet thereof, said orifice defining a cross-sectional dimension larger than said inlet area.

12. An apparatus, as claimed in claim 5, said tube having a cylindrical passage of substantially uniform diameter throughout its length, said inlet having a cylindrical passage of a diameter considerably smaller than the diameter of said passage.

13. An apparatus, as claimed in claim 5, together with means for controlling the size of said momentary pressure in dependency of the level position in said holding chamber during the interval before the next succeeding momentary pressure application.

14. An apparatus, as claimed in claim 5, together with means for controlling the length of time of application of said momentary pressure in dependency of the level position in said holding chamber.

15. An apparatus, as claimed in claim 5, together with separate heating means for each chamber.

16. A metal melting furnace comprising a pair of horizontally spaced chambers adapted to contain molten metal, means establishing a substantially unchanging first restricted communication between the chambers below the level of molten metal for restricted flow of metal therebetween, a conduit extending into one of the chambers from the upper part thereof to a point below the lower level of molten metal therein for discharge of molten metal therefrom, said conduit having means establishing a second restricted communication for the discharge of the metal from said one chamber to the interior of said conduit, and means operable for intermittently placing said one of the chambers under pressure to force molten metal therefrom through the conduit, the said first restricted communication limiting flow of metal from said one chamber to the other chamber when said one chamber is under said pressure and allowing metal to flow from the other chamber into said one chamber when said one chamber is not under said pressure.

17. In a metal furnace as claimed in claim 16, together with, a secondary melting loop communicating with the said other chamber, and means operable to produce a time varying flux cutting the secondary loop to induce a flow of heating current therein.

18. A metal melting furnace comprising a pair of horizontally spaced open topped chambers adapted to contain molten metal, means establishing a substantially unchanging first restricted communication between the chambers below the level of molten metal therein, a conduit extending into one of the chambers from the upper part thereof to a point below the lower level of molten metal therein for discharge of molten metal therefrom, said conduit having means establishing a second restricted communication for the discharge of the metal from said one chamber to the interior of said conduit, means operable for intermittently introducing gas under pressure into the upper part of said one of the chambers to force molten metal therefrom through the conduit, the said first restricted communication limiting flow of metal from said one of the chambers to the other chamber during discharge, and means actuatable to heat the metal in the other chamber.

19. A metal furnace as claimed in claim 18, said heating means comprising means defining a secondary loop communicating with the said other chamber, and means operative to produce a time varying flux cutting the secondary loop.

20. A metal melting furnace comprising a pair of horizontally spaced chambers adapted to contain molten metal, means establishing substantially unchanging restricted communication between the chambers below the level of molten metal for restricted flow of metal therebetween, a discharge conduit extending into one of the chambers from the upper part thereof to a point below the normal level of molten metal therein for discharge of molten metal therefrom, and means for periodically placing said one of the chambers under pressure to force molten metal therefrom through the discharge conduit, the restricted communication limiting flow of metal from said one chamber to the other chamber when said one chamber is under pressure and allowing metal to flow from the other chamber into said one chamber when said one chamber is not under pressure.

21. A metal melting furnace comprising a pair of horizontally spaced chambers adapted to contain molten metal, means establishing substantially unchanging restricted communication between the chambers below the level of molten metal for restricted flow of metal therebetween, a discharge conduit extending into one of the chambers from the upper part thereof to a point below the normal level of molten metal therein for discharge of molten metal therefrom, means for periodically placing said one of the chambers under pressure to force molten metal therefrom through the discharge conduit, the restricted communication limiting flow of metal from said one chamber to the other chamber when said one chamber is under pressure and allowing metal to flow from the other chamber into said one chamber when said one chamber is not under pressure, a secondary melting loop communicating with the other chamber, and means to produce a time varying flux cutting the secondary loop to induce a flow of heating current therein.

22. A metal melting furnace comprising a pair of horizontally spaced open topped chambers adapted to contain molten metal, means establishing substantially unchanging restricted communication between the chambers below the level of molten metal therein, a discharge conduit extending into one of the chambers from the upper part thereof to a point below the normal level of molten metal therein, a cover closing the top of said one of the chambers, means for periodically introducing gas under pressure into the upper part of said one of the chambers to force molten metal therefrom through the discharge conduit, the restricted communication limiting flow of metal from said one of the chambers to the other chamber during discharge, and means to heat the metal in the other chamber.

23. A metal melting furnace comprising a pair of horizontally spaced open topped chambers adapted to contain molten metal, means establishing substantially unchanging restricted communication between the chambers below the level of molten metal therein, a discharge conduit extending into one of the chambers from the upper part thereof, to a point below the normal level of molten metal therein, a cover closing the top of said one of the chambers, means for periodically introducing gas under pressure into the upper part of said one of the chambers to force molten metal therefrom through the discharge conduit, the restricted communication limiting flow of metal from said one of the chambers to the other chamber during discharge, means defining a secondary loop communicating with the other chamber, and means to produce a time varying flux cutting the secondary loop to induce a flow of heating current therein.

24. In a method of intermittently dispensing molten metal from a holding chamber fed from a supply chamber at all times substantially unchangingly intercommunicating therewith, the steps comprising, intermittently applying elevated gaseous pressure to the level of said molten metal in the holding vessel, guiding the discharged metal upwardly at an angle to the vertical out of said holding chamber, and feeding molten metal from said supply chamber into said holding chamber during the time intervals between elevated pressure applications while restricting during the elevated pressure application periods the amount of metal flowing from said holding chamber into said supply chamber.

25. A furnace for molten metal comprising a supply chamber and a closed holding chamber for molten metal, means operable for heating the molten metal, means defining a passage interconnecting said chambers establishing at all times a substantially unchanging restricted communication between said chambers, a discharge conduit extending with its lower end into said holding chamber to a point below the normal level of molten metal therein and extending with its upper end to the exterior of said holding chamber to a point above said level, and means operable for intermittently placing said holding chamber under gaseous pressure to force molten metal therefrom through the discharge conduit, said passage restricting the amount of molten metal flowing under the applied pressure from said holding chamber into said supply chamber, and allowing molten metal to flow from the supply chamber when said pressure ceases.

26. A furnace for molten metal as claimed in claim 25 in which the discharge conduit has a restricted orifice disposed below the molten metal level and the cross-section of the means defining said restricted communication passage is at least as large as the cross-section of the said orifice.

27. A furnace for molten metal as claimed in claim 25 in which the discharge conduit has a restricted orifice disposed below the molten metal level and the cross-section of the means defining said restricted communication passage corresponds to a diameter within the range of from one-half (½) to one and one-half (1½) inches, said orifice having a cross-section corresponding to a diameter of about one-half (½) inch, the cross-section of said restricted passage means being at least equal to the cross-section of the said orifice.

References Cited in the file of this patent

UNITED STATES PATENTS

| 136,091 | Overend | Feb. 18, 1873 |
| 629,459 | Nadall et al. | July 25, 1899 |
| 643,274 | Place | Feb. 23, 1900 |
| 721,381 | McAdams | Feb. 24, 1903 |
| 1,634,482 | Youtsey | July 5, 1927 |
| 1,672,728 | Otis | June 5, 1928 |
| 1,736,188 | Daesen et al. | Nov. 19, 1929 |
| 2,380,109 | Hopkins | July 10, 1945 |
| 2,536,859 | Tama | June 2, 1951 |
| 2,659,121 | Easton et al. | Nov. 17, 1953 |
| 2,674,640 | Tama | Apr. 6, 1954 |
| 2,707,718 | Tama | May 3, 1955 |

FOREIGN PATENTS

| 571,806 | Germany | Mar. 6, 1933 |
| 583,338 | Germany | Sept. 1, 1933 |
| 699,787 | Germany | Dec. 6, 1940 |